July 3, 1956  N. S. CURTIS  2,752,883
APPARATUS FOR CONVEYING ARTICLES
Filed June 4, 1952  2 Sheets-Sheet 1

INVENTOR.
NORMAN S. CURTIS
BY
Harry E. Downer
Attorney

July 3, 1956 N. S. CURTIS 2,752,883
APPARATUS FOR CONVEYING ARTICLES
Filed June 4, 1952 2 Sheets-Sheet 2

INVENTOR.
NORMAN S. CURTIS
BY
*Harry E. Doerner*
Attorney

United States Patent Office 2,752,883
Patented July 3, 1956

2,752,883

APPARATUS FOR CONVEYING ARTICLES

Norman S. Curtis, Indianapolis, Ind., assignor to Ransburg Electro-Coating Corp., Indianapolis, Ind., a corporation of Indiana Application June 4, 1952, Serial No. 291,723

7 Claims. (Cl. 118—316)

This invention relates to improvements in apparatus for conveying a series of articles along a predetermined path. Particularly this invention is directed to improvements in the apparatus broadly described in the co-pending application of James W. Juvinall, Serial No. 289,333, previously filed June 22, 1952.

Continuously moving conveyors are in common use for carrying articles of manufacture over a predetermined path past a number of stations for the successive processing of the articles. It is frequently desirable that the articles be more intimately spaced along one portion of the path than along other portions or that the articles be moved past a predetermined point at a speed somewhat greater or less than the normal speed of the articles along the balance of the path. If such changes in spacing or speed of conveyor-borne articles is performed abruptly the inertia of the moving articles and their supports may cause swinging, swaying or other inter-article movement as the articles move for a considerable distance down the conveyor. Such movement is often commercially objectionable especially where the articles are so closely spaced that movement will cause adjoining articles to strike each other and perhaps dent, chip, or otherwise damage the articles.

An object of my invention is to provide an improved and highly efficient apparatus for varying the speed of and/or spacing between articles being moved along a predetermined path.

Another object of my invention is to provide improved means for transferring hanging articles from one conveyor track to another without appreciable swinging or swaying of the articles.

A further object is to provide flexible conveyor apparatus readily adjustable to accommodate at different times articles of varying size or with varying requirements of spacing.

A still further object is to provide improved means for varying the speed of and/or spacing between articles carried on a conveyor by positive and controlled means.

Yet another object is to provide improved means for moving a series of articles along a substantial portion of a predetermined path at an incrementally, i. e., gradually, varying velocity.

To accomplish the foregoing objects I utilize a rotating screw having a thread which varies in pitch along the length of the screw as the propelling means for the article supports. This screw may lie longitudinally and closely adjacent to the path of article movement so that an arm projecting from each article support may engage the thread of the rotating screw thereby to propel the article support along a path of idler rollers. Convenient means may be employed for disengaging a portion of the article supporting structure from the main conveyor track so that the article support may travel freely along the idler roller path propelled solely by means of the rotating screw. The speed of the article support and thus of the article itself may be increased or decreased or held constant as desired depending entirely upon the pitch and speed of rotation of the screw. When it is no longer required that the speed or spacing of the article be varied, the article supports may be transferred in succession by suitable means for re-engagement with a conventional conveyor track for movement at a constant speed and with a fixed distance between the article supports.

Improved apparatus for accomplishing the aforementioned and related object is hereinafter fully described with reference to the accompanying drawings wherein.

Figure 1:
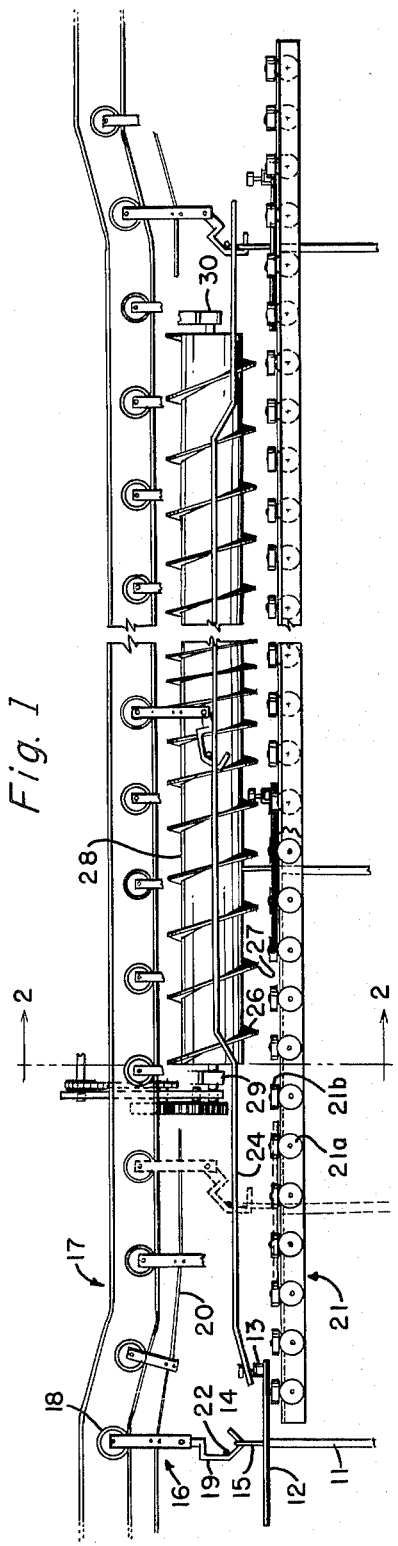
Fig. 1 is a side elevation view of an exemplary embodiment of my invention.
Figure 3:
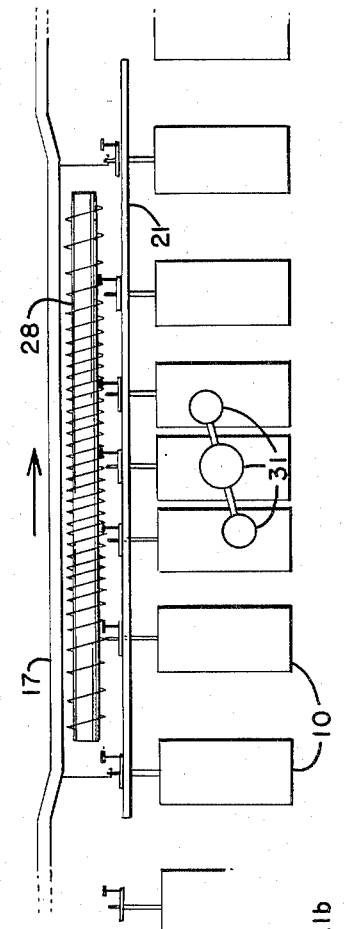
Fig. 3 is a diagrammatic elevation illustrating the use of the apparatus shown in Fig. 1 for coating articles.
Figure 2:
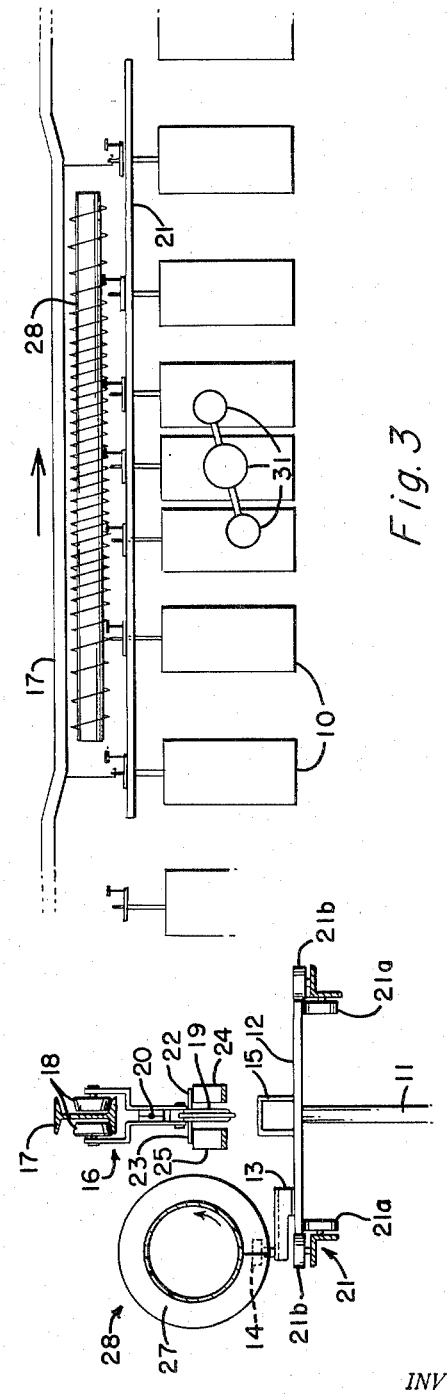
Fig. 2 is a cross-sectional view taken along line 2—2 of Fig. 1.

Referring first to Figs. 1, 2, and 3, articles 10 are illustrated as rectangular cabinets for electric refrigerators, but the apparatus may be used to convey articles of any shape. The articles (shown only in Fig. 3) are suspended from a series of article supporting arms 11 each of which is in turn connected to the lower face of an article supporting square plate 12 which has an upwardly extending arm 13 connected to one of its corners. A rotatable cylindrical roller 14 is affixed to the upper end of arm 13. A hook-engaging member 15 with a horizontal center section is connected to the upper face of plate 12.

This article supporting structure (arm 11, plate 12, arm 13 and member 15) is carried along the first portion of the desired article path by means of a trolley 16 which straddles the lower flange of a main I beam conveyor track 17. Trolley 16 is carried along track 17 on a plurality of rollers 18 which roll along the upper faces of the lower flange of the I beam. Hook 19, pivotally connected by a horizontal pin to the lower segment of trolley 16, engages member 15 and thus carries the article supporting structure. Trolley 16 and a series of like trolleys uniformly spaced along track 17 are connected in any convenient manner to movable cable 20 which generally parallels track 17 and is driven from a suitable source of power (not shown) normally at a uniform velocity.

As trolley 16 approaches that portion of the path along which a varied or different speed or spacing of the articles is desired, plate 12 moves over a separate conveyor track 21 which consists of two parallel series of vertical rollers 21a for supporting plate 12 and two series of horizontal rollers 21b on either side of the plate for guiding it along the predetermined path. At this point on the path, track 17 dips downwardly to deposit plate 12 on track 21 and, subsequently, to bring two arms 22 and 23 on either side of hook 19 into engagement with separate tracks 24 and 25. As trolley 16 is lowered by the dipping of track 17 so that arms 22 and 23 rest on tracks 24 and 25, hook 19 will pivot about arms 22 and 23 and the lower portion of the hook will be rotated clockwise into a position below and to the rear of the horizontal segment of member 15. In this position of hook 19 the forward movement of cable 20 will continue to be transmitted through trolley 16 and hook 19 to the article supporting structure which will be "dragged" 'forwardly along track 21. Thereafter, as plate 12 moves beneath the rotating screw, roller 14 on arm 13 will come in contact with the forward face 26 of thread 27 of rotating screw 28.

Screw 28 is positioned longitudinally of conveyor track 21, above it, and somewhat to the side of the center line of the track. The entire screw is supported at its ends on bearings 29 and 30 and is rotatable about its axis by means of powered gearing (shown in Fig. 5 and which will be hereinafter described). Thread 27 of screw 28 varies in pitch along a major portion of the length of the screw. The screw is so designed that the rotating thread, as it first engages roller 14, pushes plate 12 along track 21 slightly in excess of the forward speed of cable 20. Thus the transfer from cable-propulsion to screw-propulsion is accomplished without substantial swinging, swaying or other interarticle movement and yet the speed of plate 12 will be increased to somewhat more than the speed of cable 20 to cause member 15 to move forward faster than hook 19 and to disengage from the hook. After member 15 has become disengaged from hook 19, tracks 24 and 25 are inclined upwardly to cause hook 19 to further pivot about arms 22 and 23, thus raising the lower end of hook 19 until it will be unable to re-engage member 15 of any article supporting structure traversing track 21.

The pitch of thread 27 decreases slowly so that the forward velocity of plate 12 is gradually decreased, permitting successively trailing article supporting structures to "catch up" and to effect a decrease in the spacing between adjacent articles by a positive means and at a controlled rate. The pitch of thread 27 may then be held constant so that the articles will move at a constant rate and with uniformly close spacing between them along a predetermined portion of the path.

While the articles are thus closely spaced they may be moved into cooperating position with appropriate spray coating or other processing equipment located on one or both sides of the moving articles. Fig. 3 shows a convenient adaptation of my invention arranged cooperatively with spray coating apparatus. The close spacing will present the articles for coating substantially as a continuous web or flat sheet of material, provided the sides of the articles are panels, which will contribute to obtaining a smooth, uniform coating and will also prevent waste of coating material which would otherwise be projected between widely spaced particles. Three electrostatic spraying heads 31 are positioned on each side of the articles to be coated so that the spray from each head will blend with the spray from adjacent heads to obtain a uniform coating along the entire surface of the articles 10 presented for coating as they move along conveyor track 21.

After the articles have been fully coated the spacing between the articles is slowly increased by a gradual increase in the pitch of screw thread 27 beyond the point where articles 10 leave the processing zone. This increase in the pitch of thread 27 continues along the balance of the screw stem so that plate 12 will be incrementally accelerated to the speed of the trolley on the main conveyor. Near the end of screw 28 tracks 24 and 25 dip slightly downward so that hook 19 will pivot counterclockwise about arms 23 and 24 and the lower end of the hook will move into engaging position with the horizontal segment of member 15. Hook 19 will overtake the moving plate 12 and re-engage member 15. At this same time plate 12 will reach the end of screw 28 so that the plate will again be propelled forwardly by moving cable 20. Beyond the end of screw 28 track 17 inclines upwardly so that as trolley 16 traverses the incline it will pick up plate 12 and carry it away from engagement with track 21. Articles 10 will continue to be propelled by cable 20 at a constant rate and with a uniform spacing between adjacent articles. It is apparent that swinging or other inter-article movement between successive articles 10 would be particularly objectionable when articles are "bunched" for processing or as they are incrementally accelerated upon leaving the coating zone. To this end the acceleration of the articles must be very gradual, i. e., incremental, and accomplished over a substantial portion of the path without abrupt changes in the forward movement of the articles.

Figures 4, 5:
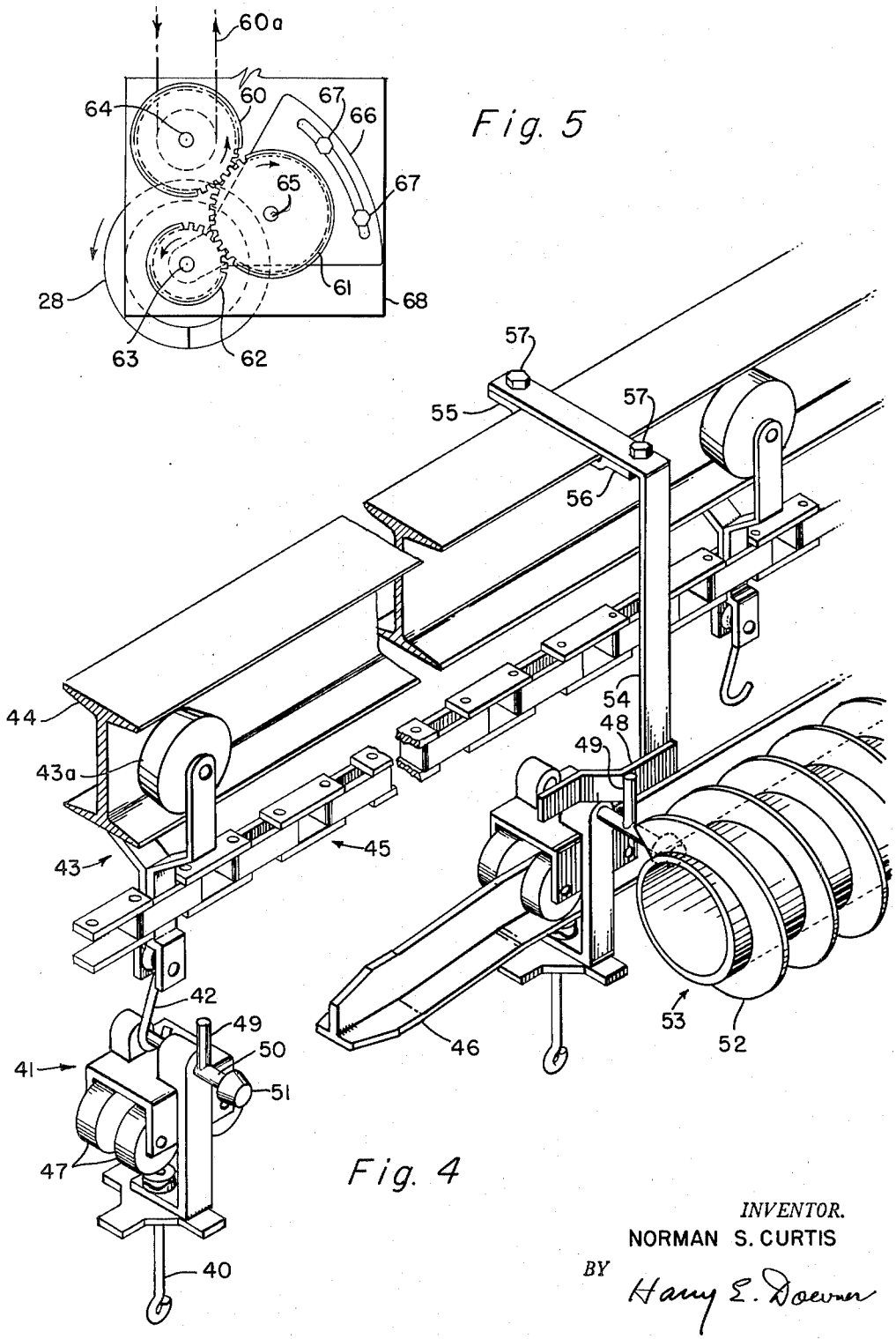
Fig. 4 is an isometric view of another embodiment of my invention.
Fig. 5 is a detailed view of a form of driving mechanism for the apparatus shown in Figs. 1 and 3.

A further embodiment of my invention is shown in Fig. 4. Articles (not shown) are supported from hangers 40 connected to the bottom of lower trolley 41 which in turn is suspended by hook 42 from upper trolley 43. Upper trolley 43 straddles main track 44 and rolls along this main track on rollers 43a. Movement along main track 44 is obtained by connecting upper trolley 43 by suitable means to movable chain 45 which moves generally parallel to the main conveyor track driven from a convenient source of power (not shown). As trolleys 41 and 43 approach that portion of the path along which varied speed or spacing of articles is desired, chain 45 moves lower trolley 41 into engagement with lower track 46 along which trolley 41 moves on rollers 47. The two trolleys are disengaged from each other by means of cam 48 which is positioned so that the face of cam 48 engages pin 49 which is rigidly mounted on supporting arm 50. On engagement of pin 49 with the outwardly extending face of cam 48, arm 50 slides out to disengage arm 50 from hook 42 and at the same time moving roller 51, located at the end of arm 50, into position between adjacent turns of thread 52 of the rotating screw 53.

Screw 53 is rotatably mounted so that its axis is parallel to lower track 46 and in the same horizontal plane as the axis of arm 50. The screw is rotated by suitable driving means (as shown in Fig. 5). Thread 52 has a varying pitch along its length. The screw is designed and rotated so that on initial engagement between roller 51 and a face of thread 52 lower trolley 41 will be propelled along track 46 at substantially the same speed as the forward speed of chain 45. Thus the change from chain-propulsion to screw-propulsion will be accomplished smoothly. The pitch of thread 52 then incrementally decreases over a substantial length of the thread so that trolley 41 will undergo a gradual deceleration as it moves along this portion of track 46 thus permitting successive trolleys to "bunch up". The pitch of thread 52 may then be maintained at a constant value so that the articles will move along this intermediate portion of the path at a uniformly slow velocity and with close spacing between adjacent articles. Along this portion of the path the desired processing or treating of the articles requiring slow speed and/or close spacing may take place.

The pitch of thread 52 then incrementally increases so that the articles are gradually accelerated and their spacing thus increased in a positive manner. As the articles approach the end of track 46 and screw 53, arm 50 may be moved inwardly by a suitable cam (not shown but similar to cam 48) to disengage roller 51 from thread 52 and at the same time providing a means for re-engaging the upper and lower trolleys by connection of hook 42 with arm 50 so that the articles may continue along main conveyor track 44 at a constant rate and with uniform spacing between articles.

In both of the modifications above described, the speed and spacing of articles traversing the main conveyor track will obviously depend upon the speed of cable 20, chain 45 or other propelling means therein employed and on the distance between adjacent trolleys being moved by such propelling means. The speed of articles along the screw-propelled portion of the path will depend upon the speed of rotation of screw 28 or 53 and on the pitch of the screw thread. If the pitch of the thread is fixed at all points along its length, the speed of screw-propelled articles at any point along the track will be a function of the rate of rotation of the screw. The ratio of the speed of the articles to their spacing will be the same while the articles are traversing the main conveyor track and while they are traversing the intermediate portion of the screw. The spacing of articles traversing the intermediate portion of the screw will necessarily equal an integral multiple of the pitch of the screw over that intermediate portion. To prevent interference between roller 14 or 51 and thread 27 or 52, it will be necessary that the screw make an integral number of revolutions between successive arrivals of articles at the point where the transfer from the conventional conveyor to the screw takes place.

Increasing the speed of rotation of the screw while retaining the same speed for the main conveyor will increase both the speed and spacing of articles traversing the intermediate portion of the screw. A change in the speed of the screw will necessarily change the forward velocity of articles at all points along the screw-propelled portion of the path, thus causing abrupt change-over from conventional propelling means to screw-propulsion, or vice versa, due to the substantially instantaneous acceleration or deceleration of the article supporting structure provided the location of the transfer point remains unchanged. To permit changing the relative speed between articles traversing the main conveyor and screw-propelled articles within a wide range and yet to retain a smooth and gradual transfer, it may be desirable to change the location of the transfer point. In Fig. 4 I have therefore indicated the transfer cam 48 as supported for adjustment along main conveyor track 44. The means for effecting such adjustment comprises a cam-supporting arm 54 clamped to the upper flange of track 44 by clamps 55 and 56 and bolts 57 and 58 so that arm 54 may be rigidly positioned at any desired point along track 44.

Due to variations in the size of the articles to be carried or due to varying requirements of spacing between articles, it may be desired to provide for changes in the speed of rotation of the screw and thereby to change the center-to-center distance of articles moving through the intermediate portion of the screw-propelled conveyor. Fig. 5 is a detailed view showing one convenient driving mechanism which may be used to obtain the aforementioned desired change in the speed of screw rotation in a simple and economical manner. Gear 60 is driven by chain 60a from an appropriate source of rotary power (not shown). Gear 60 drives gear 61 which in turn drives gear 62 which is connected to one end of a shaft 63 mounted concentrically with the stem of screw 28 or 53. Shafts 64 and 65 rotatably support gears 60 and 61 respectively and lie parallel to shaft 63. Shaft 65 about which gear 61 rotates can be adjusted in parallel relation to shafts 63 and 64 of gears 62 and 60 respectively. This adjustment may be provided by mounting shaft 65 on a plate 66 through suitable roller bearings. Plate 66 is positioned to pivot about shaft 63. Studs 67 are used to lock plate 66 into position against backing plate 68 after plate 66 has been pivoted about shaft 63 so that shaft 65 has been moved into the desired relationship with shafts 63 and 64. By selection and installation of suitable gears 61 and 62, the speed of rotation of the screw may be varied to obtain the desired spacing of articles in the processing zone, depending upon the distance apart of successive articles along main conveyor track 17, without varying the speed of rotation of gear 60.

The foregoing will render the conveying apparatus flexible and adaptable to a wide variety of articles and conditions. As an example of the adaptability of the apparatus, it is assumed that the articles to be coated measure 21" x 21" in plan view and that these articles are hung from trolleys on the main conveyor track which are 48" apart. It is further assumed that it is desired to space the articles 1½" apart in the coating zone and that the pitch of the screw is uniformly 1½" in the intermediate portion of the screw (in the coating zone). In order to maintain the required equality between the ratio of speed to spacing in the main conveyor and in the intermediate portion of the screw under the assumed conditions, mechanism controlling the speed of the screw must be selected so that 48" of travel along the main conveyor track is accomplished simultaneously with exactly 22½" of travel in the intermediate portion of the screw (21" width of article plus 1½" spacing). It will obviously require exactly 15 turns of a screw whose pitch is 1½" to move an article 22½" and thus speed control mechanism for the screw, as for example gears 61 and 62, may be selected which will produce 15 revolutions of the screw during the time interval required to move an article 48" along the main conveyor track. A point of change-over from conventional propelling means to screw propulsion may be selected so that at such point the velocity by conventional propelling means and by screw-propulsion will be substantially the same and, likewise, the same selection of a transfer point may be made on the change from screw-propulsion to conventional propelling means subsequent to coating or other processing of the articles. The determination of these change-over points will depend upon the particular design of the screw thread.

While two embodiments of my invention have been described and shown in detail, it is apparent that numerous modifications and adaptations may be made without departing from the spirit and scope of my invention. It is understood that the invention is not limited to the foregoing embodiments but that its breadth is to be determined solely by the appended claims.

I claim:

1. Apparatus for conveying articles successively over a predetermined path, comprising a series of article supports, means for engaging said supports and propelling them over a first portion of said path with a uniformly wide spacing between adjacent supports, means operative at a predetermined point along said path for disengaging the supports successively from said propelling means, a rotating screw extending parallel to a second and a third portion of said path to, and means operative as said supports become disengaged from said propelling means for successively engaging said supports with said rotating screw to propel them first with a gradually decreasing spacing along such second path portion and then with a uniformly close spacing along such third path portion for processing the supported articles while so closely spaced.

2. An article conveying apparatus comprising a series of article supports, first guiding means for guiding said supports in succession over a first and third portions of a predetermined path, first propelling means for propelling said supports over the first and third portions of said path at a constant rate and with a uniformly wide spacing between said supports, second guiding means for guiding said supports in succession over a second portion of said path, means for disengaging said first propelling means from said supports operative as the supports engage the second guiding means, a second propelling means including a rotating screw with a thread of varying pitch engageable with said article supports as they become disengaged from said first propelling means for propelling the supports on said second guiding means, and means operative at the end of said second guiding means for disengaging said second propelling means from said supports and for re-engaging said first propelling means with said supports to propel said supports along said third portion of said path.

3. An article conveying apparatus comprising a series of article supports, a first track for guiding said supports in succession over the first portion of a predetermined path, means including a plurality of releasable members each engaging one of said article supports for moving said article supports along said first portion of said path at a constant rate and with uniform spacing between succeeding supports, a second track for guiding said supports over the second portion of said path, transfer means for successively depositing each article support smoothly onto said second track as the support reaches said second path portion and for then disengaging said support from the support-engaging member of said moving means while maintaining the supported article in a stable position relative to its adjacent articles, and means including a rotating screw with a thread of varying pitch engaging with article supports deposited on said second track for moving said article supports along said second path portion at a varying speed.

4. Apparatus as set forth in claim 3 wherein the pitch of said screw thread varies to first move an article support along said second path portion at a rate greater than the rate of movement of said article support along said first path portion to move said article support ahead of the member which engaged said article support with said moving means, then moving said article support at a gradually decreasing rate, then at a uniform rate less than said first path portion rate, and finally at a gradually increasing rate approaching said first path portion rate.

5. An article coating apparatus for coating the outwardly facing opposite sides of a plurality of generally rectangular articles comprising a plurality of independently movable article supports each supporting an article, first guiding means for guiding said supports in succession over a first portion of a predetermined path, means for moving said supports along said first path portion at a constant rate and with relatively wide spacing between adjacent articles, second guiding means for guiding said supports over the second portion of said path, means for smoothly depositing each of said article supports as it reaches said second path portion onto said second guiding means and for disengaging said support from said moving means while maintaining the supported article in a stable position relative to its adjacent articles, means including a rotating screw with a thread of varying pitch lying along said second path portion engaging with article supports deposited on said second guiding means for first moving said supported articles at a gradually decreasing rate of speed whereby the outwardly facing opposite sides of adjacent but spaced apart articles form two substantially continuous surfaces to be coated and then moving said relatively closely spaced articles at a constant rate along a substantial part of said second path portion, and coating means adjacent said second path portion for spray coating the closely spaced outwardly facing opposite sides of the articles.

6. Apparatus for spray coating the outwardly facing opposite sides of a series of generally rectangular articles comprising a plurality of independently movable article supports each carrying an article to be coated, a first conveyor track for guiding said supports in succession over a first portion of a predetermined path, moving means including a plurality of releasable members each engaging one of said article supports for moving said supports successively over the first portion of said path at a constant velocity and with a relatively wide spacing between adjacent articles, a second conveyor track for guiding said supports in succession over a second, a third and a fourth portion of said path, transfer means for depositing the article supports as they successively reach said second path portion onto said second conveyor track and for disengaging said supports from the support-engaging member of said moving means while maintaining the supported articles in a stable position relative to adjacent articles, means including a rotating screw with a thread of varying pitch engaging with article supports deposited on said second conveyor track for first moving said supports along the second portion of said path with a gradually decreasing spacing between adjacent articles traversing said second path portion, and secondly moving said supports along the third portion of said path at a constant velocity and with a relatively close spacing between adjacent articles traversing said third path portion whereby the outwardly facing opposite sides of adjacent but spaced apart articles will form two substantially continuous surfaces to be coated, and thirdly moving said supports along the fourth portion of said path with a gradually increasing spacing between adjacent articles traversing said third path portion, and spray coating means adjacent said third path portion for spray coating the closely spaced outwardly facing opposie sides of the articles moving therealong.

7. An article conveying apparatus comprising a first track; a plurality of trolleys movable along said first track; means for moving said trolleys along said first track at a constant rate; a hook depending from each of said trolleys; an article support releasably suspended from each of said hooks, said article support including a projecting arm; a second track for supporting said article supports independently of said trolleys, said second track having a portion running in the same vertical plane as, beneath and slightly rising in relation to said first track whereby hook-suspended article supports moving therealong will be deposited on said second track and become supported solely by said second track and will rise free of confinement by said hooks while maintaining the supported articles in a stable position relative to adjacent articles; and means including a rotating screw engaging the projecting arms of said article supports after they are deposited on said second track for moving said article supports along said second track at a rate slightly greater than that of said trolleys whereby said article supports are propelled forward and out of contact with said hooks.

References Cited in the file of this patent

UNITED STATES PATENTS

| 761,610 | Riblet | May 31, 1904 |
|---|---|---|
| 800,783 | Adkins et al. | Oct. 3, 1905 |
| 1,298,285 | Bogaty | Mar. 25, 1919 |
| 1,632,569 | Taylor | June 14, 1927 |
| 1,875,966 | Webb et al. | Sept. 6, 1932 |
| 2,002,507 | Porter | May 29, 1935 |
| 2,259,748 | Hullhorst | Oct. 21, 1941 |
| 2,335,790 | Ransburg | Nov. 30, 1943 |
| 2,344,155 | McBride et al. | Mar. 14, 1944 |
| 2,351,921 | Bullard, 3rd, et al. | June 20, 1944 |
| 2,619,916 | Rainier | Dec. 2, 1952 |

FOREIGN PATENTS

| 27,682 | Great Britain | Dec. 9, 1912 |